United States Patent [19]

Peterson et al.

[11] Patent Number: 4,646,687
[45] Date of Patent: Mar. 3, 1987

[54] ANIMAL WATERER

[75] Inventors: Jerry D. Peterson, Conrad, Iowa; Gerald L. Knief, Bay St. Louis, Mo.

[73] Assignee: Ritchie Industries, Inc., Conrad, Iowa

[21] Appl. No.: 761,973

[22] Filed: Aug. 2, 1985

[51] Int. Cl.⁴ .............................................. A01K 7/00
[52] U.S. Cl. ................................................... 119/73
[58] Field of Search ............................ 119/73, 74, 78

[56] References Cited

U.S. PATENT DOCUMENTS

| 976,874 | 11/1910 | Hasman, Jr. | 119/78 |
| 1,329,939 | 2/1920 | Todd | 119/73 |
| 2,665,366 | 1/1954 | Cleveland | 119/73 X |
| 3,745,977 | 7/1973 | Martin | 119/73 |
| 3,943,889 | 3/1976 | Sparber | 119/73 |
| 3,948,221 | 4/1976 | Wiuniski | 119/73 X |
| 4,100,885 | 7/1978 | Kapplinger | 119/73 |
| 4,559,905 | 12/1985 | Ahrens | 119/73 |

FOREIGN PATENT DOCUMENTS 697114  11/1979  U.S.S.R. .............................. 119/73

Primary Examiner—Robert P. Swiatek
Attorney, Agent, or Firm—Todd S. Parkhurst

[57] ABSTRACT

An improved animal waterer which prevents ice formation and saves energy through the combination of a top cover, drink tube, and a novel drink float. Minimizing the water surface exposed to the air reduces heat transfer from the water to the air. A drink float allows an animal to drink freely and prevents heat loss. The combination further saves energy, hinders ice formation and inhibits contaminants from entering the water supply. A waterer housing corner guard inhibits the formation of loose animal hair contaminants.

17 Claims, 4 Drawing Figures

ANIMAL WATERER

BACKGROUND OF THE INVENTION

An essential ingredient in the growth and development of domestic farm animals is water. Farmers spend a great deal of time and energy insuring their animals have drinkable water available at all times.

The job of providing water to livestock is complicated during the months of freezing winter weather in most U.S. farmlands. Ice can form a barrier thick and tough enough to prevent the animals from getting their much needed water. When this happens, farmers must spend valuable time attending to water supplies and in clearing and reclearing the ice.

Attempts have been made to prevent the formation of ice through the use of heaters. However, heat transferred to the water by the heaters is rapidly lost to the atmosphere through the water surface exposed to the freezing air causing the heaters to run continuously. Continuous-running heaters are very expensive and inefficient.

A device disclosed in U.S. Pat. No. 3,745,977 (Martin) locates an insulated cover on the water surface to provide a barrier between the water surface and the freezing air. Thirsty animals are required to move the cover to expose drinkable water. However, under severe winter conditions, this can freeze the cover to a cover seat in a closed position. When the waterer is frozen up in this way the animals may not be able to dislodge the corner and reach the water they require.

It is accordingly a general object of the present invention to provide an inexpensive, energy efficient and effective animal waterer that will encourage water availability at all times, even in the harshest of winter freezing conditions.

Another object of this invention is to provide an animal waterer that can inhibit contaminants from entering the water container.

It is also an object to provide an animal waterer that is of durable construction, yet allows easy maintenance.

Other objects and advantages of the invention will become apparent upon reading the following detailed description and upon reference to the drawings. Throughout the drawings, like reference numerals refer to like parts.

DETAILED DESCRIPTION

While the invention will be described in connection with several preferred embodiments, it will be understood that it is not intended to limit the invention to these embodiments. On the contrary, it is intended to cover all alternatives, modifications and equivalents as may be included in the spirit and scope of this invention as defined by the appended claims.

Figure 1:
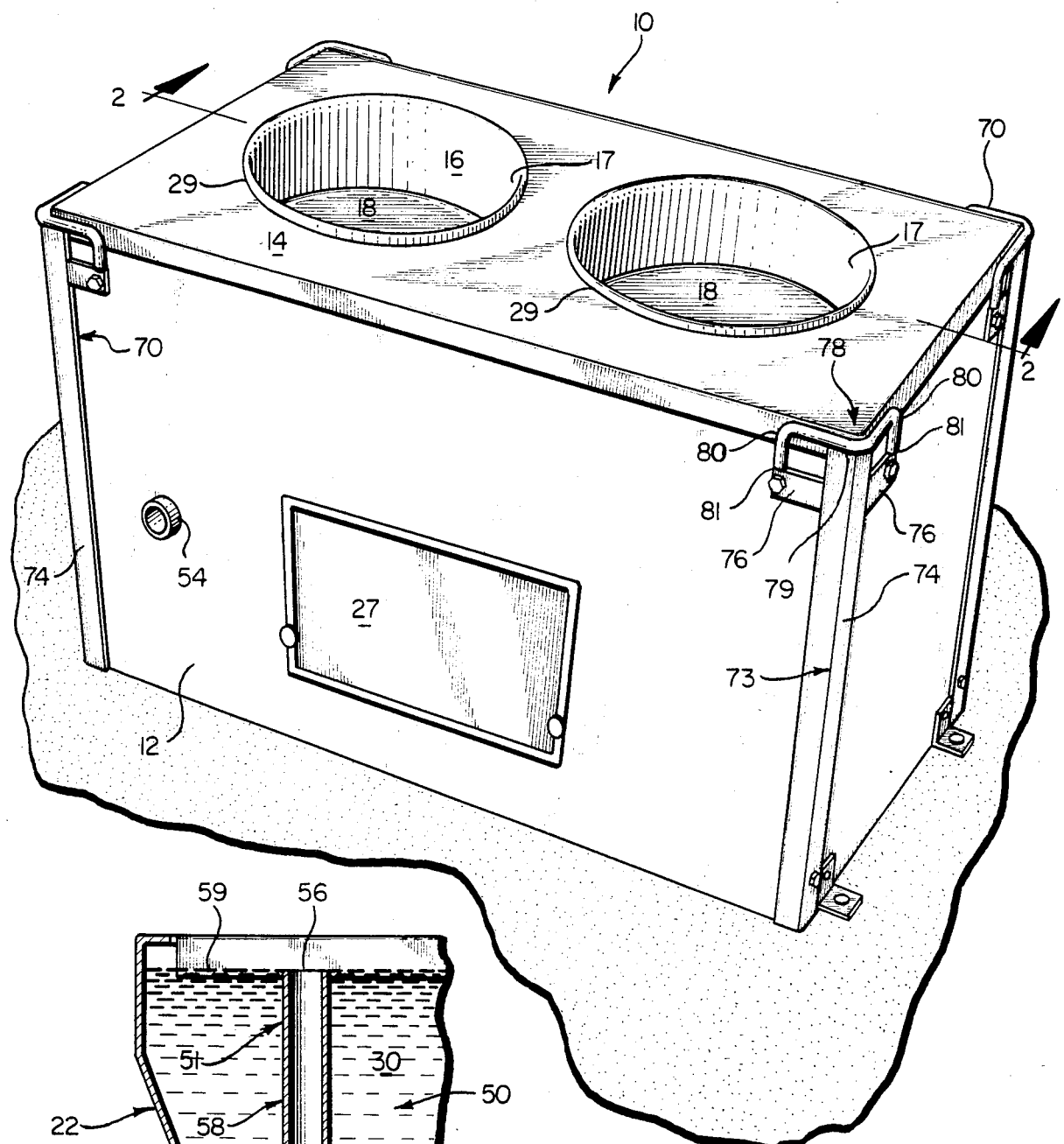
FIG. 1 is a perspective view showing the preferred embodiment of a novel animal waterer.

Turning first to FIG. 1, there is shown a novel animal waterer 10 embodying the present invention. Generally, the waterer comprises a container 12, a top cover 14, and one or more drink tubes 16 extending downwardly through mating aperture 17 formed in the top cover 14. A drink float 18 is disposed within each tube 16.

Figure 2:
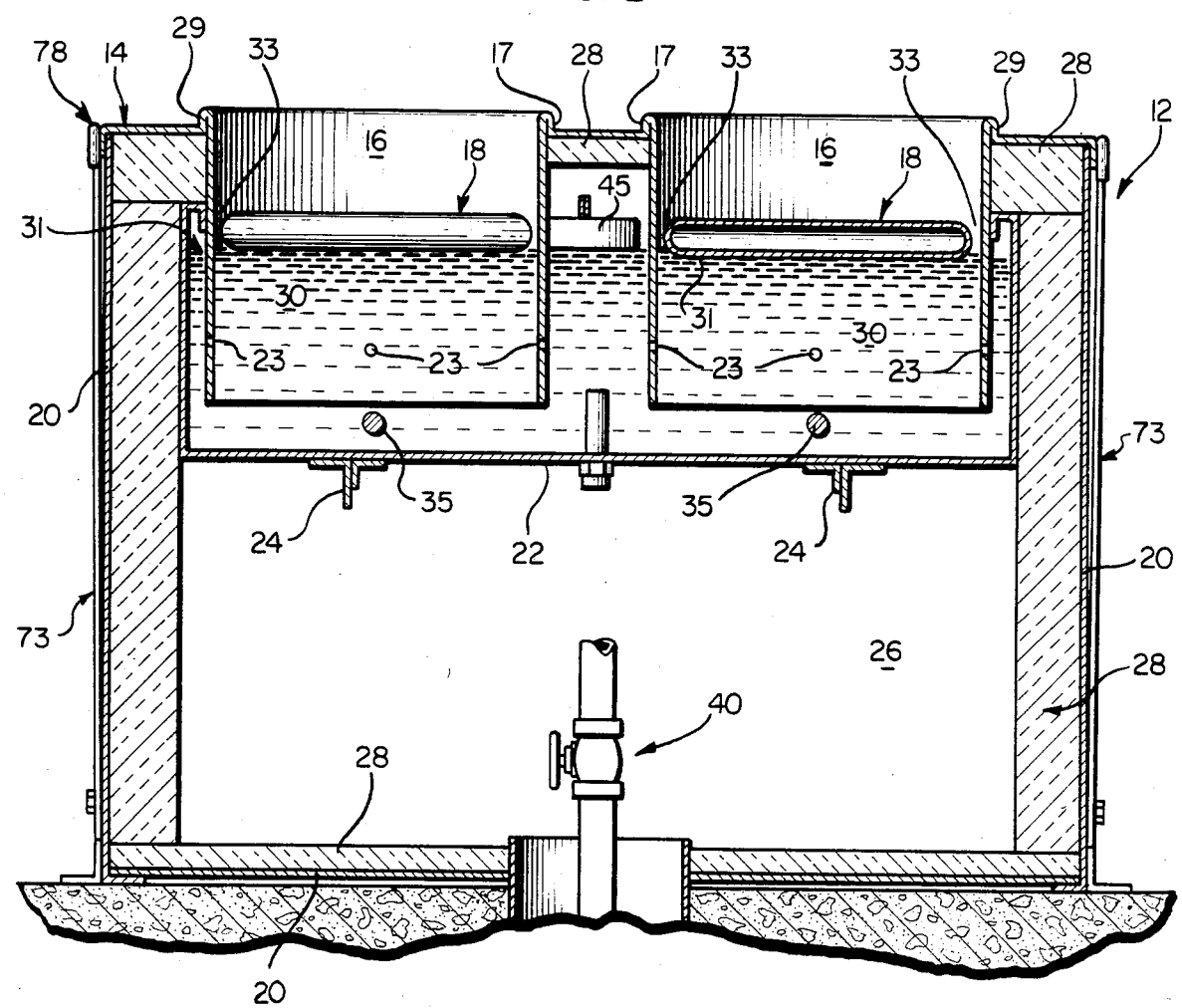
FIG. 2 is a fragmentary sectional view taken substantially along line 2—2 in FIG. 1.

More specifically, as depicted in FIG. 2, the preferred embodiment employs a container 12 having a housing 20, a trough 22 supported in the upper portion of the housing 12 by trough supports 24, and a lower chamber 26 defined by the housing 20 below the trough 22. A door 27 in a housing wall can provide access to the chamber 26 for maintenance. The trough 22 can be constructed of hard plastic, galvanized steel or any durable material which can contain water.

The top cover 14 and housing 20 can be constructed from durable, workable material, such as galvanized sheet steel or similar material, that can withstand the abuse of both weather and farm animals. The top cover 14 is designed to make positive contact with the housing 20 all around the waterer periphery in order to stay firmly in place on the housing 20 even under high winds or animal abuse.

The inside surface of the top cover 14 and the housing 20 are lined with insulation 28. This insulation can take the form of styrofoam low-density plastic, and it can be several inches thick. Less insulation may be required on the bottom housing than on the other inside surfaces.

To provide access to the water 30 within the trough 22, at least one drink tube 16 extends down through an aperture 17 in the top cover 14. Each drink tube 16 can be constructed of galvanized sheet steel or a hard plastic, and it can be formed either as part of the cover 14, or as a separate unit. As a separate unit, the drink tube 16 has a lip 29 around the top edge. When the drink tube 16 is inserted through the opening 17 in the top cover 14, the drink tube 16 slides down until the lip 29 securely rests on the surface of the top cover 14. In place, the drink tube 16 projects downward through the top cover 14 into the water in the trough 22. Convection water circulation into and out of the tube 16 is encouraged by holes 23 formed in the tube 16.

In cold weather, thermal energy held by a body of water is most readily lost to the atmosphere at the water surface. A novel feature of this invention minimizes the amount of water surface which is directly exposed to the atmosphere. This surface area exposure is minimized through the combination of the top cover 14, the drink tube 16, and the drink float 18.

The drink float 18 is constructed of a buoyant insulator, such as two sheets of hard plastic, joined together and sealed around the edges to form an internal cavity 29, as illustrated in FIG. 2. If desired, the cavity can be filled with an insulating foam plastic or other material. In the preferred embodiment, the drink float 18 is a circular, flat disk which floats upon the water surface 31.

In accordance with one aspect of the invention, the float 18 is inhibited from freezing to the tube 16. To this end, the drink float 18 is confined within the drink tube 16, but is sized to provide some positive clearance 33 between the drink tube 16 and the drink float 18. The drink float 18 thus has unrestricted longitudinal movement within the drink tube 16 and will rise or fall with the rise and fall of the water surface 31. The water level in the drink tube 16 will reflect the water level within the trough 22, because the pressure inside the drink tube 16 is substantially the same as the water pressure within the trough 22 but outside the open-ended tube 16.

An animal seeking a drink will learn to place its mouth within the drink tube 16 and push down on the drink float 18. As the buoyant drink float 18 is unconstrained within the drink tube 16, the downward pressure applied downward to a portion of the drink float 18 will cause that portion to submerge below the water surface 31, thus exposing the water 30 to the animal. After taking as much water 30 as the animal desires, the animal will lift its head from the drink tube 16, and remove the downward pressure on the drink float 18. The submerged portion of the buoyant drink float 18 will then return to a position on the water surface 31 within the drink tube 16.

The drink float 18 substantially reduces the amount of exposed water surface 31 and thereby greatly reduces the heat lost by the water surface 31 to the atmosphere. However, during conditions of prolonged cold weather, heat will nevertheless be lost to the atmosphere and, without an outside heat source, the water might eventually freeze.

Figure 3:
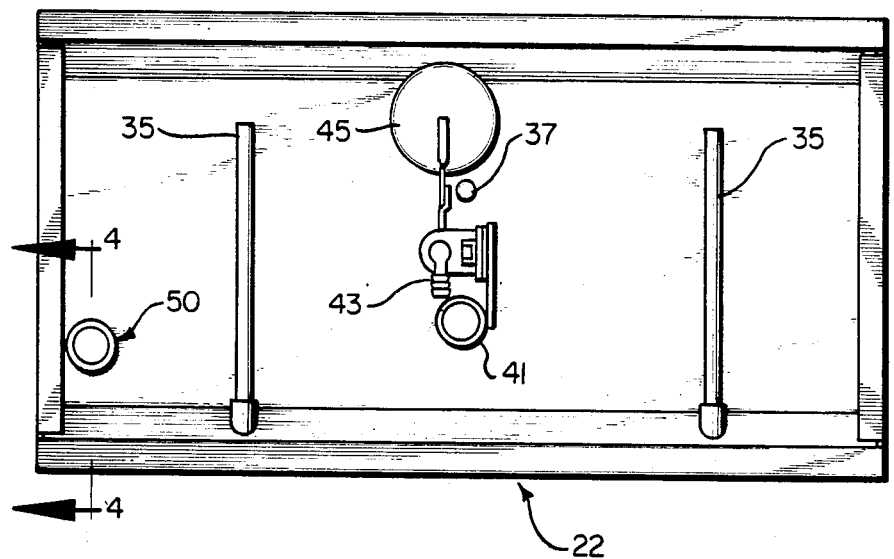
FIG. 3 is a top plan view of the trough, upper parts of the trough being removed for clarity.

To discourage water freeze-up in accordance with the invention, heating elements 35 are placed within the trough 22 to add thermal energy to the water as shown in FIG. 3. A thermostat 37 monitors the temperature of the water 30, and automatically turns the heating elements 35 on and off to maintain the water 30 at a preselected temperature somewhat above freezing.

Any standard heating element, such as an 80 watt immersion heater, using a standard 120 volt AC power supply and thermostatic regulator can supply the heat. Experiments with a waterer of the type described here have demonstrated the surprising and unexpected results of a 60% savings in energy costs over a previously known waterer.

In the illustrated embodiment of the present invention, means are provided to attach an outside water supply to the trough 22. As best depicted in FIGS. 2 and 3, an outside water supply 40 enters the container 12 through the housing bottom 20 and extends into the chamber 26. The water supply 40 is connected to a standpipe 41 inside the trough 22. While any known method of regulating water level can be employed, a standard valve 43 and valve float 45 will be described. In a steady state, the valve 43 shuts off the water intake hose (not shown) coming from the standpipe 41 and connected to the water supply 40. As the water level 31 drops, the valve float 45 follows it, which in turn releases pressure on the valve 43. When the water level has dropped to a preselected position, the valve float 45 has lowered sufficiently to allow the valve 43 to disengage from the water fill hose. Water then enters the trough 22 through the open water fill hose. As the water level rises, so does the valve float 45. Once the water level reaches a preselected position, the valve float 45 is able to apply sufficient pressure to the valve 43 to force the valve 43 to shut off the water intake hose, thus returning to a steady state.

Figure 4:
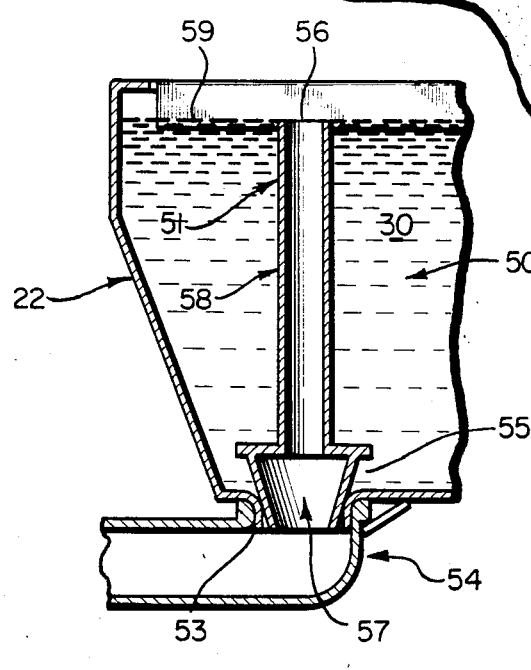
FIG. 4 is a fragmentary sectional view taken substantially along line 4—4 in FIG. 3.

An overflow regulator 50, as shown in FIG. 4, provides a means to carry off excess water from within the trough 22. A conduit 51, of a preselected height less than the inside height of the trough 22, is engaged to a port outlet 53 by a coupler element 55, which forms a water tight seal between the conduit 51 and the port outlet 53 when engaged, but also allows for easy disengagement of the conduit 51 from the port outlet 53. Attached to the bottom side of the port outlet 53 is a conventional drain 54. The conduit 51 is formed of a water resistant material, such as a hard plastic, and has an open top end 56 and an open bottom end 57. Between the two open ends is a closed body 58 for fluid transfer. When engaged with the port outlet 53, the conduit 51 assumes a substantially vertical position. The vertical height of the conduit 51 is preselected to define the maximum desirable water level 59. Water exceeding the maximum desirable water level 59 flows in the open top end 56, where it is communicated by the body 58 out the bottom end 57 through the port outlet 53 and into a drain 54 to be carried off from the waterer.

A coupler element 55 holds the conduit 51 in place and prevents water from entering the port outlet 53 except through the conduit top end 56. However, the coupler 55 is designed to be easily engaged with and disengaged from the port outlet 53. When disengaged, water flows directly into the drain 54 through the port outlet 53. Thus, in accordance with another aspect of the invention, the trough 22 can be quickly and substantially completely drained via the port outlet 53 by disengaging the coupler 55 from the conduit 51.

In addition to providing energy efficiency, the top cover 14, drink tube 16 and drink float 18 prevent contaminants from entering and fouling the water. In the case of cattle, a particular source of intrinsic contaminant is animal hair. The hair comes off naturally or by the animal rubbing on the waterer. The hair then drops, or is blown into the water, where it can clog the waterer or be consumed by the animals which leads to health problems.

To reduce the hair problem and to strengthen the animal waterer 10, in accordance with another aspect of the invention, the waterer includes a novel wear guard 70 as shown in FIGS. 1 and 2.

The wear guard 70 is comprised of an angle iron 73 formed by two legs 74 disposed substantially perpendicularly to each other. Near the top of the angle iron 73 a projection 76 extends outwardly from each leg 74 as an extension of the angle formed by the two legs 74. The angle iron 73 and projections 76 can be formed from a durable material, such as galvanized sheet steel.

A rod 78 of substantially circular cross section is attached across, and covering, the angle-iron top portion 79. The rod 78 then extends outward from both sides of the angle iron 73 to a position approximately equal to the distance that the distal end of the projections 76 extend from the legs 74. Rod arms 80 then turn downward and extend to the projections 76 where they are attached by weld mounts 81.

The wear guard 70 protects the corners of the waterer 10 from being rubbed by the animals. The rod 78 protects the animals from sharp edges which can scrape off hair or injure their skin. The less hair scraped off, the less possible contaminants there are to foul the water.

The invention is claimed as:

1. Apparatus for watering animals, comprising, in combination:

a container to hold water;

a cover mounted atop the container to close the container, the cover having at least one opening being defined therein;

a drink tube mating with said at least one cover opening and extending through the cover opening, the drink tube being a substantially closed cylindrical wall extending from the cover down below a lower cover surface into the container to an open lower end, the open lower end of the cylindrical wall being positioned above the bottom of the water held in the container and below the top of the water held in the container so that water entering the drink tube enters from a container medial water level; and having a drink float having a greater horizontal extent than a vertical depth and being adapted to float upon the water surface within the tube, the drink tube and float being sized and shaped to provide unobstructed vertical clearance and unobstructed vertical movement of the float within the drink tube over a range of normal float use positions, the drink tube and float being further sized and shaped to provide some positive horizontal clearance between the drink float and the drink tube so as to permit a perceptible amount of water in the tube to be exposed at all times to thirsty animals and to attract an animal to drink from the drink tube, the horizontal clearance allowing an animal seeking water from the drink tube to gain access to the water in the drink tube by applying a minimal downward force to the drink float.

2. Apparatus for watering animals according to claim 1 further comprising insulating means lining the inside of said container and said top cover.

3. Apparatus for watering animals according to claim 1 wherein said container includes:

a housing; trough support means; and a trough to hold water, the trough having four walls and a bottom, the trough being supported by the trough support means within the housing.

4. Apparatus for watering animals according to claim 3 wherein said trough is located in an upper portion of the housing, and wherein a lower chamber is defined by said housing below said trough.

5. Apparatus for watering animals according to claim 4 further comprising heater means within said container.

6. Apparatus for watering animals according to claim 5 wherein said heater means are mounted inside the trough.

7. Apparatus for watering animals according to claim 5 further comprising thermostat means to regulate said heater means to maintain the water within said trough at a preselected temperature.

8. Apparatus for watering animals according to claim 3 wherein said trough further comprises:

water supply means to deliver water to said trough; and water regulator means connected between said water supply means and said trough to monitor and regulate the quantity of water within said trough.

9. Apparatus for watering animals according to claim 3 further comprising:

port outlet means in said trough bottom to permit substantially complete draining of said trough; and overflow regulator means to prevent the water from exceeding a preselected maximum level.

10. Apparatus for watering animals according to claim 9 wherein said overflow regulator means includes:

a conduit of length less than the inside height of said trough, the conduit having an open top end to define the preselected maximum water level, an open bottom end, for normally engaging said port outlet means in said trough bottom, and a closed body member for conducting fluid from the top open end to the bottom open end; and coupling means attached to the conduit bottom end to allow repeated engagement and disengagement with said port outlet and which forms a waterproof seal between the conduit bottom end and said port outlet when engaged to prevent water from exiting through said port outlet until reaching the preselected maximum water level defined by the conduit open top end, and when disengaged allows substantially complete draining of said trough through said port outlet.

11. Apparatus for watering animals according to claim 3 wherein said housing of rectangular construction four walls and a bottom; and wherein said apparatus further comprises corner wear guard means secured to the outer vertical corners of the rectangular housing to protect the corners of the housing from animals rubbing against the corners of the housing.

12. Apparatus for watering animals according to claim 11 wherein said corner wear guard means includes:

an angle-iron body having a first leg and a second leg disposed substantially perpendicuarly to one another; and a rod member attached to the angle-iron body for providing a rounded wear surface atop the wear guard body.

13. Apparatus to inhibit contaminants from entering an animal waterer comprising, in combination:

a container to hold water; a cover mounted atop the container to close the container to outside contaminants, the cover having at least one opening defined therein; a drink tube mating with said at least one cover opening and extending through the cover opening, the tube being supported by the said at least one cover, the drink tube being a substantially closed cylindrical wall extending from the cover down below the cover and into the container to an open lower end and the tube having a sufficient length to permit water held in the container to partially fill the drink tube whereby the water in the drink tube can be accessed from the outside of the container; and a drink float constructed of a buoyant insulator sized to fit within the drink tube and adapted to float upon the water surface within the drink tube, the float being sized and shaped to provide unobstructed vertical clearance and unobstructed vertical movement of the float within the drink tube over a range of normal float positions, the drink tube and float being further sized and shaped to provide some positive horizontal clearance between the drink float and the drink tube, the drink float thus being only partially constrained in horizontal movement within the drink tube whereby the positive horizontal clearance between the drink tube and the float permits a minimum but perceptible amount of water to be exposed at all times thereby attracting an animal to drink from the drink tube, and wherein the cover, drink tube and drink float in combination provide protection from outside contaminants entering the water and at the same time offer easy access to the water held in the container by an animal seeking water from the container.

14. Apparatus to inhibit contaminants from entering an animal waterer according to claim 13 wherein said container includes:

a walled housing of rectangular construction; and corner wear guard means secured to the outer vertical corners of the rectangular housing.

15. Apparatus to inhibit contaminates from entering an animal waterer according to claim 13 further including at least one corner wear guard having:

an angle iron having a body member of two legs disposed substantially perpendicularly to each other, the body member having a top end and a bottom end; and a rod member attached to the top end of the angle-iron body member so as to substantially cover the top end for providing a rounded wear surface atop the wear guard body.

16. Animal waterer apparatus that prevents animals from harming themselves when rubbing against the waterer, wherein the waterer apparatus comprises, in combination:

a container to hold water, the container having a housing of rectangular construction; a top cover atop the container to close the container, the top cover having at least one opening being defined therein, corner wear guard means secured to the outer vertical corners of the rectangular housing, the corner wear guard means having a rod portion of substantially circular cross section positioned to at least partially extend above the outer vertical corners of the top cover; a drink tube mating with said cover opening, extending through the cover opening and extending from the top cover down below the cover and into the container, the drink tube being a substantially closed cylindrical wall having an open upper end and at open lower end, the open lower end extending into the water held in the container to a medial position above the bottom of the water held in the container and below the surface of the water held in the container; and a drink float sized and shaped to fit within the drink tube and to provide some positive horizontal clearance between the drink float and the drink tube, the drink float further being sized and shaped to have unobstructed vertical movement within the drink tube, whereby the rod portion of the wear guard having no sharp edges protects animals from scraping off their hair or injuring their skin when they rub up against the corners of the waterer.

17. Animal waterer apparatus according to claim 16 wherein said corner wear guard means further includes:

an angle-iron body having a first leg and a second leg disposed substantially perpendicularly to one another; and a rod member attached to the angle-iron body for providing a rounded wear surface atop the wear guard body.

* * * * *